July 5, 1927.
K. PROBST
TRACTION WHEEL
Filed Aug. 18, 1924
1,634,683
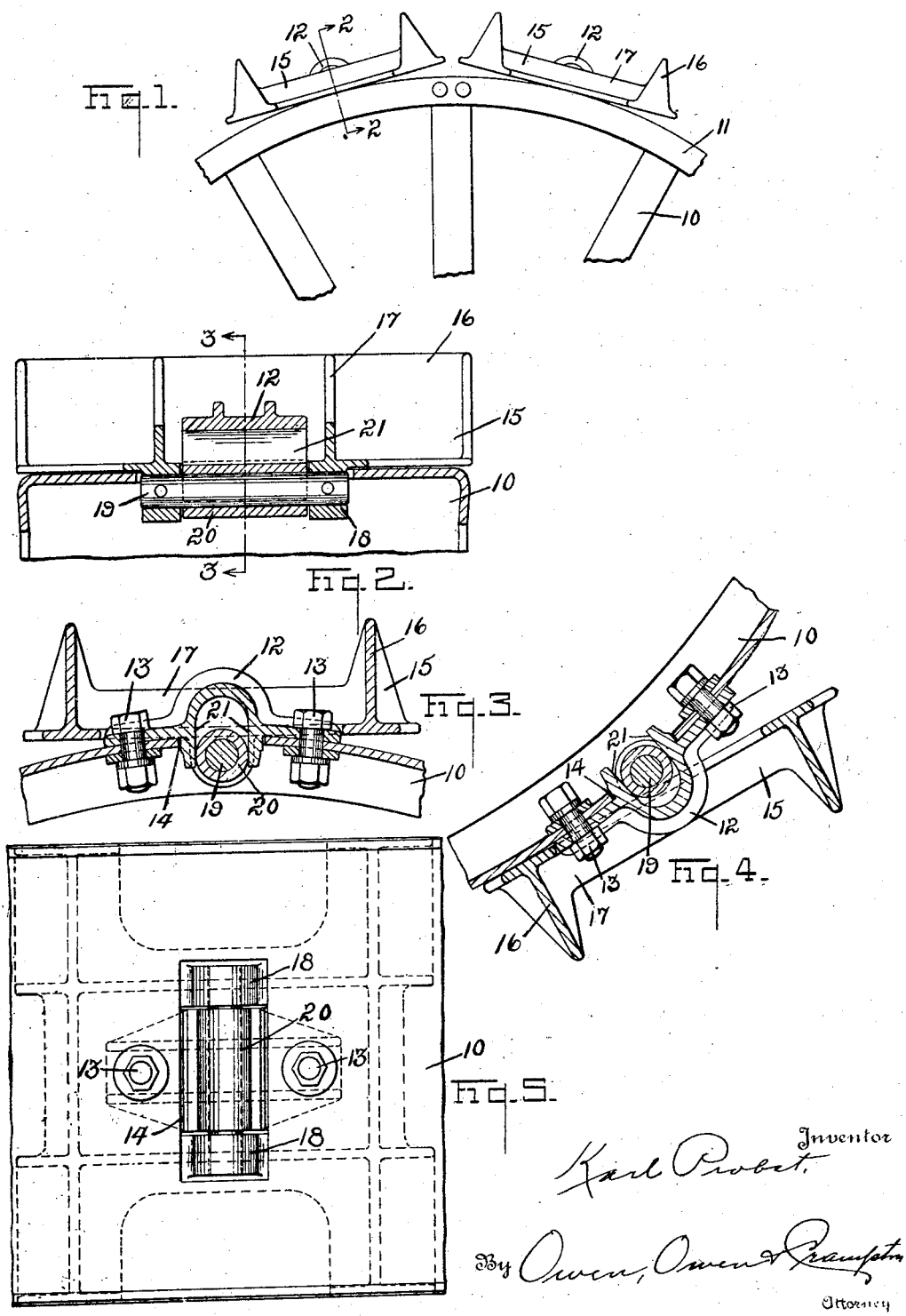

Patented July 5, 1927.

1,634,683

UNITED STATES PATENT OFFICE.

KARL PROBST, OF TOLEDO, OHIO.

TRACTION WHEEL.

Application filed August 18, 1924. Serial No. 732,621.

My invention has for its object to produce in a traction wheel having a plurality of tractor elements that are provided with plane surfaces that present progressively smooth even surfaces substantially parallel to the surfaces of the ground, the wheel being provided with a smooth cylindrical surface that continuously rolls along the successive plane surfaces of the tractor elements, a simple and efficient means for interconnecting the traction wheel with the traction elements whereby peripheral movements of the traction elements relative to the wheel are practically eliminated, and which are formed of parts that are exceedingly durable against the wear and tear to which such parts are subjected in long use of the traction wheel and which may be replaced at a very low cost. Thus my invention provides, in such wheels, a simple construction whereby all back-lash is obviated and consequently the driving force of the traction wheel may be reversed to cause the wheel to reverse, without slipping or shifting of the periphery of the wheel with reference to the traction elements, and wherein the spaces for the collection of mud between the parts that interconnect the traction elements and the traction wheel are largely eliminated, and moreover the interengaging surfaces are protected from contact with mud, stones and dirt of the surface over which the tractor travels.

The invention may be contained in structures which in their details may vary in form and still be within the purview of the novelty of the invention. To illustrate a practical application of the invention I have selected one of the structures containing the invention as an example of such structures and shall describe it hereinafter. The structure selected is shown in the accompanying drawings.

Figure 1 of the drawings illustrates a side view of a top portion of the wheel having the traction elements. Fig. 2 is a sectional view taken on the line 2—2 indicated in Fig. 1. Fig. 3 is a sectional view taken on the line 3—3 indicated in Fig. 2. Fig. 4 is a sectional view similar to that shown in Fig. 3, the position of the traction element being that shortly after the traction element has first engaged the surface of the ground, or that when the traction element is about to leave the ground according to the direction in which the wheel is moving. Fig. 5 is a view of a part of the rim looking from the axis of the wheel.

The traction wheel 10 is provided with a broad rim 11 which progressively presents a broad smooth rolling surface to the traction elements 15 as they are successively carried forward between the axis of the wheel and the ground. The wheel 10 is provided with a plurality of traction element engaging members 12 that are bolted by means of the bolts 13 to the rim 11. The members 12 extend from opposite sides of the cylindrical surface of the periphery of the wheel, that is they extend through slots 14 that are formed in the rim 11. The traction elements have traction wheel engaging members that are located within the traction element engaging members 12 whereby the wheel and the elements interengage and efficient traction is produced. In the form of construction shown, the traction elements are each provided with lugs 18. Pins 19 are secured in the lugs 18 and rollers or sleeves 20 may be located on the pins 19. The rollers or sleeves 20 in the form of construction shown are the traction wheel engaging members. They are located within the traction element engaging members 12 and as the wheel rotates they enter and recede from within the cylindrical surface of the periphery of the wheel and thus they progressively move in the slots 14 formed in the rim as the wheel rolls along the ground.

The tractor securing members 12 have lateral surfaces 21 located on opposite sides of the wheel engaging members 20. The lateral surfaces 21 are preferably plane surfaces that extend substantially equidistant to opposite sides of the cylindrical peripheral surface of the wheel and are, within the limitations of mechanical construction, separated from each other a distance equal to the diameter of the wheel engaging members 20 of the traction elements 15. As the wheel rolls along the ground, placing the traction elements successively in position to be rolled over or to be rolled upon, the traction wheel and the traction wheel engaging elements slide relative to each other, and during the functioning of the tractor elements to produce traction, the engaging members press against each other with substantially a constant uniform pressure from the time that the ground gripping flanges first engage the ground until they leave the ground, although the actuating power may be reversed to reverse direction of rotation of the wheel. This is due to the fact that the interengaging members interengage along surfaces that extend approximately equi-distant to opposite sides of the rolling and plane surfaces respectively of the traction wheel and the traction elements that make contact, that is, the engaging lateral surfaces of the traction engaging members conform substantially to that portion of an involute curve which would be generated by a point located a short distance above the plane surface of the traction element and which extends substantially equi-distant to opposite sides of the cylindrical peripheral surface of the traction wheel, the height of the point above the plane surface of the traction element being dependent on the length and the degree of the arc of the rim extending between centers of the openings 14. This portion of the involute curve lies substantially upon a radius of the wheel and consequently the lateral surfaces of the traction element engaging members may be plane surfaces located parallel to the said radius of the wheel. Thus all back-lash is eliminated and the structure simplified, and yet an efficient driving connection is at all times maintained.

In the operation of the traction wheel, the traction elements when below the horizontal plane of the axis of rotation of the wheel tend to take a horizontal position since their centers of gravity are below the axes of the pins 19 and consequently as they approach the ground, the pins 19 and sleeves 20 are located in the lower ends of the members 12, and as the wheel passes over each tractor element, the engaging member 12 passes downward over the sleeve 20 until the wheel rests on the midline of each traction element, and the sleeve is located within the rim of the wheel. As the wheel continues to rotate, the member 12 is raised relative to the sleeve until the traction wheel rolls off of the traction element when the traction element is tilted and then picked up and carried over the top of the wheel.

I claim:—

1. The combination with a rim, and a traction shoe upon the periphery thereof, of a pivot for said shoe movable inwardly and outwardly with respect to said periphery, and guide means for said pivot element constructed and arranged so that said pivot element will always move in the same straight line inwardly and outwardly with respect to the periphery of said rim.

2. The combination with a rim, and a traction shoe upon the periphery thereof, of a pivotal connection between said shoe and rim including an element movable always in a predetermined straight line inwardly and outwardly with respect to said rim.

3. The combination with a rim, and a traction shoe upon the periphery thereof, of a pivotal connection between said rim including an element carried by said shoe and movable in a straight line inwardly and outwardly with respect to the periphery of said rim, and means carried by said rim for guiding said element so that it will always move in the same straight line inwardly and outwardly with respect to said rim.

4. A retaining element for a traction shoe comprising a bracket having a trough-shaped portion constituting a bearing for a pivot for a traction shoe, flanges projecting laterally from the sides of said trough-shaped portion and having apertures therein for receiving securing elements, and substantially parallel flanges projecting at substantially right angles to said attaching flanges and constituting guides for the pivot of aforesaid shoe.

5. In a traction wheel, a plurality of traction elements, the traction wheel having an outer cylindrical surface and the traction elements having plane surfaces that contact with the cylindrical surface and on which the wheel rolls in succession, the wheel and each of the elements having two parts that engage with each other, one of said parts having a plane surface and the other of the said parts having a curved surface, the said surfaces making driving contact with each other at a point that shifts back and forth along the plane surface and from a point on the inside of the cylindrical surface of the wheel and to a point on the outside of the cylindrical surface of the wheel, as the wheel rolls on the traction element.

6. In a traction wheel, a plurality of traction elements, the wheel having traction engaging members, and the traction elements having traction wheel engaging members, one set of said engaging members having parallel plane surfaces and the other set of said engaging members having cylindrical surfaces that substantially fit between the said parallel plane surfaces at all times, the said plane surfaces extending equi-distant on the inside and outside of the outer cylindrical surface of the wheel.

7. In a traction wheel, a plurality of traction elements, the traction wheel having members, the members having plane surfaces that extend equi-distant inside and outside of the outer cylindrical surface of the wheel, the traction elements having cylindrical members fitting between the plane surfaces, the axes of the cylindrical members movable parallel to the plane surfaces and equi-distant to the inside and to the outside of the cylindrical surface of the wheel.

8. In a traction wheel, a plurality of traction elements connected to the wheel, each traction element having a roller, the wheel having a plurality of pairs of parallel surfaces terminating in a cylindrical surface, each roller fitting a pair of the said parallel surfaces, and the cylindrical surface and movable along the plane surfaces, the plane surfaces extending equi-distant inside and outside of the wheel, the parallel plane surfaces being separated by a distance substantially equal to the diameter of the roller, and the cylindrical surface located at the outside ends of the plane surfaces.

9. A traction wheel comprising a rim having an aperture therein, a shoe having a member disposed in said aperture and teeth secured to said rim and disposed within said aperture and co-operating with said member to form a driving engagement between said rim and said shoe.

10. A traction wheel comprising a rim having an aperture therein, a shoe having a transverse bar disposed in said aperture, and a holder loosely engaging said bar to hold said shoe on said rim and having teeth disposed in said aperture and co-operating with said bar to form a driving engagement between said rim and said shoe.

In testimony whereof I have hereunto signed my name to this specification.

KARL PROBST.